United States Patent [19]
Wallover

[11] 3,762,554
[45] Oct. 2, 1973

[54] CONTINUOUSLY REGENERATING ACTIVE EARTH FILTERING APPARATUS FOR LIQUID WASTES

[75] Inventor: James I. Wallover, Beaver, Pa.
[73] Assignee: Wallover Oil Company, East Liverpool, Ohio
[22] Filed: Feb. 4, 1972
[21] Appl. No.: 223,516

[52] U.S. Cl............... 210/179, 110/13, 210/186, 210/216, 210/267, 210/276, 210/DIG. 12
[51] Int. Cl........................ B01d 35/18, C02b 1/02
[58] Field of Search ............... 210/33, 40, 68, 152, 210/184, 186, 267, 272, 274, 276, 328, 330, 334, DIG. 12, 268, 63, 216, 325; 110/13

[56] References Cited
UNITED STATES PATENTS

| | | | |
|---|---|---|---|
| 2,617,986 | 11/1952 | Miller | 210/267 X |
| 1,895,284 | 1/1933 | Hay | 210/268 X |
| 882,202 | 3/1908 | Hunt | 210/DIG. 12 |
| 2,595,627 | 5/1952 | Barnebl et al. | 210/DIG. 12 |
| 3,695,432 | 10/1972 | McCrink | 210/152 X |
| 3,587,862 | 6/1971 | Lee | 210/330 |
| 3,620,373 | 11/1971 | Crell et al. | 210/328 X |
| 3,509,835 | 5/1970 | Dibelius et al. | 210/68 X |

Primary Examiner—Samih N. Zaharna
Assistant Examiner—Robert H. Spitzer
Attorney—Brown, Murray, Flick & Peckham

[57] ABSTRACT

A continuously rotating annular foraminous table has concentric upper side walls extending upwardly from its opposite sides and concentric lower side walls extending downwardly from those sides. Overlying a segment of the table is a stationary arcuate open-bottom furnace that receives the upper side walls. A bed of activated earth is maintained on the table as the filtering material. Adjacent the exit end of the furnace there is means for delivering onto the bed a waste liquid to be filtered. Air is drawn down through the area of the bed and table outside of the furnace. A trough below that area collects the filtrate. Air is blown up between the lower side walls of the table and through the table and bed into the furnace, and means are provided in the furnace for burning out combustible contaminants collected in the bed during filtering, whereby to regenerate the bed. Smoke from the furnace is burned, and gases and solids are scrubbed out of the exhaust.

10 Claims, 6 Drawing Figures

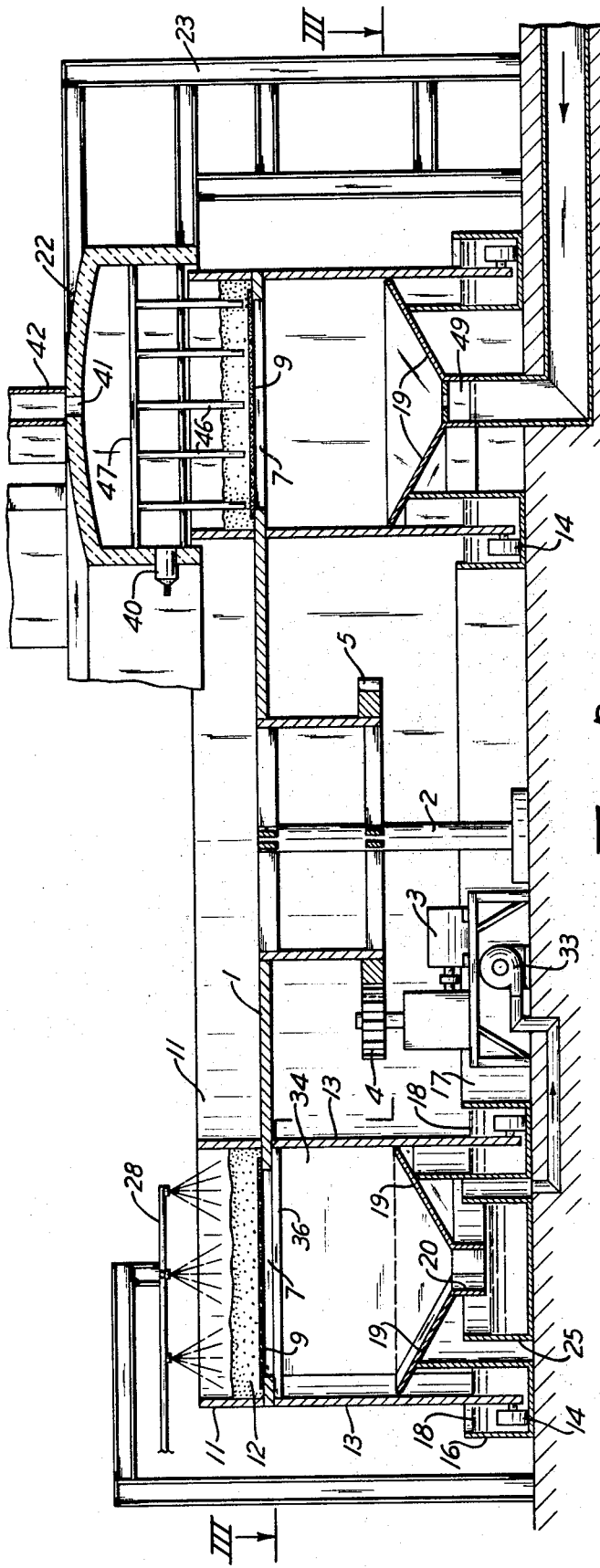
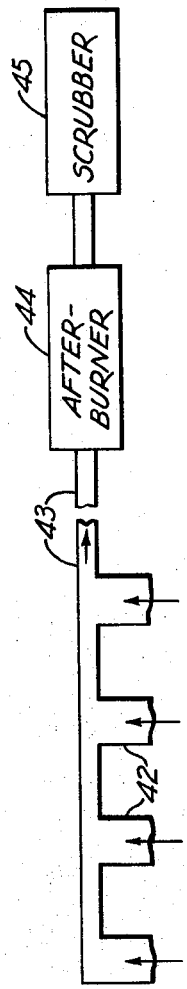
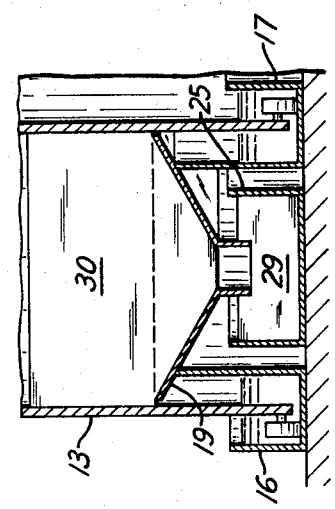

CONTINUOUSLY REGENERATING ACTIVE EARTH FILTERING APPARATUS FOR LIQUID WASTES

In filtering liquids with activated earth, if the earth is to be reused after it has become loaded with foreign matter that it filters out of the liquids, it must be regenerated by removing that matter. This is done by burning out the foreign matter. In the past it has usually been necessary to shut down the filtering apparatus while the used earth is being removed, transported to another location where it is regenerated, and then returned to the filtering apparatus. In fact, this required about two-thirds of the time necessary for a complete cycle, the remaining third being the time spent in the actual filtering. Of course, such a system is not economical, and it also requires equipment for transporting the active earth back and forth. There also have been problems of environmental pollution resulting from the regeneration of the filtering material.

It is among the objects of this invention to provide filtering apparatus using activated earth, in which the activated earth is regenerated continuously, and in which the earth remains in place in the filtering apparatus during regeneration. Another object is to provide such apparatus that does not pollute the environment.

The preferred embodiment of the invention is illustrated in the accompanying drawings, in which FIG. 1 is a plan view, partly broken away;

FIG. 2 is an enlarged vertical section taken on the line II—II of FIG. 1;

FIG. 4 is a vertical section taken on the line IV—IV of FIG. 3;

FIG. 5 is a fragmentary diagrammatic view; and

Figure 1:
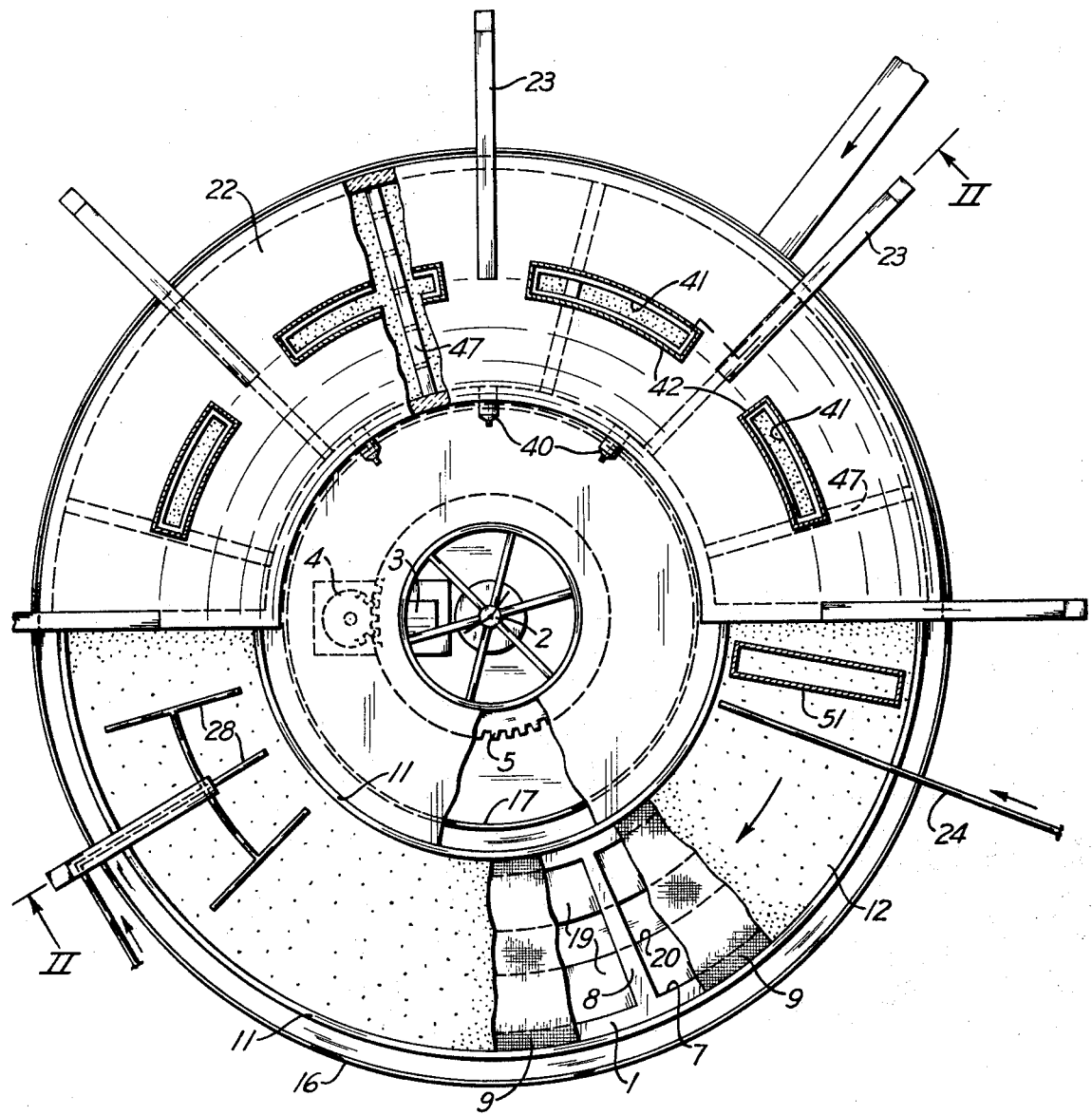
Figure 3:
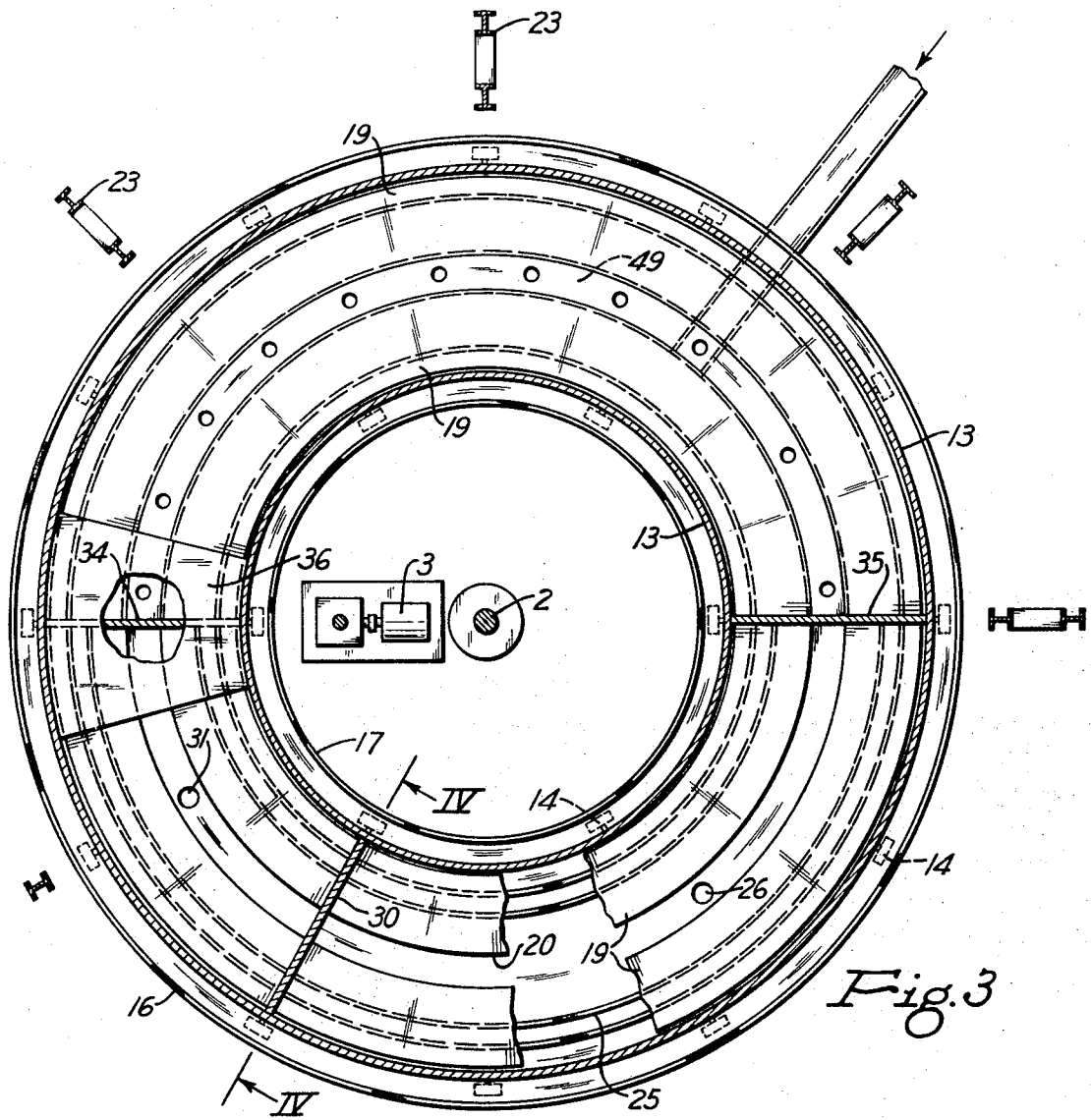
FIG. 3 is a reduced horizontal section taken on the line III—III of FIG. 2.
Figure 6:
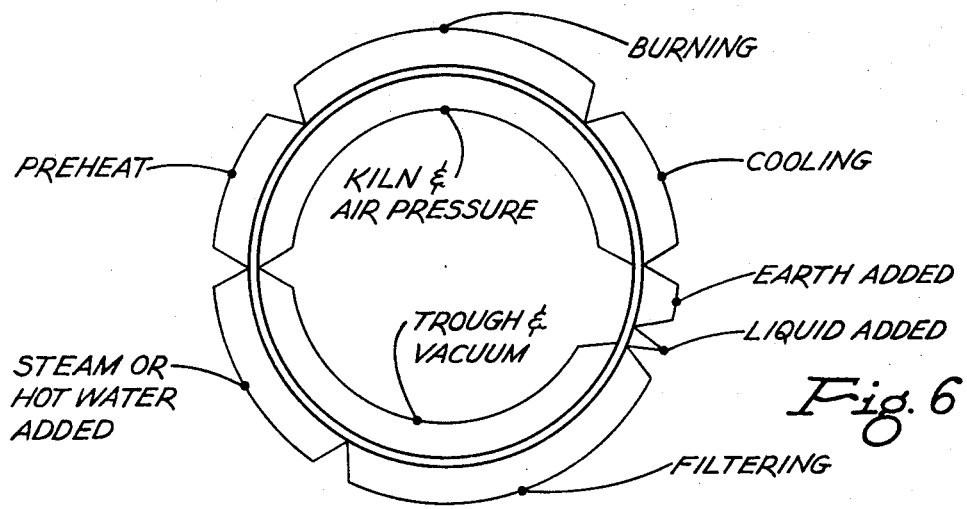
FIG. 6 is a diagram illustrating the different zones of the apparatus.

Referring to the drawings, a circular platform 1 is rotatably mounted on a center post 2 and is driven continuously by any suitable means, such as by an electric motor 3 driving a pinion 4 meshing with a ring gear 5 rigidly connected with the bottom of the platform. The platform is provided near its outer edge with wide arcuate openings 7 through it that are circumferentially spaced by narrow radial portions 8 or spokes of the platform between the slots. These slots are covered by strong screens 9 or perforated plates that form an annular foraminous table.

Extending upwardly from opposite sides of this table are concentric upper side walls 11, between which there is a bed 12 of activated earth, such as fullers earth, bauxite or alumina for example. The bed is supported by the screens and is several inches deep. Extending downwardly beneath these side walls is a pair of concentric lower walls 13 that nearly reach the floor on which the platform is mounted. To help steady the platform, the bottoms of the lower side walls may be provided with wheels 14. The wheels are at the outside of the outer wall and between the inner wall and the center post. These wheels roll in two concentric annular troughs 16 and 17, into which the lower portions of the lower side walls extend. The troughs contain water 18 to form seals between the bottoms of the walls and the troughs. The sides of the troughs between the lower side walls 13 support concentric downwardly converging plates 19, the lower edges of which are spaced apart to form an annular slot 20 between them having downwardly extending sides.

Overlying a segment of the table, generally about 180° in length, is an open-bottom furnace 22 that is supported by a number of structural steel columns 23 disposed outwardly of platform 1. The furnace receives the tops of the upper side walls 11 of the table. It is in this furnace that the used or spent activated earth is regenerated by reconditioning or reactivating it, as will be explained hereinafter. Outside of the furnace but adjacent its exit end, a pipe 24 extends across the top of the table and is provided in its bottom with openings or nozzles for delivering a liquid onto the filter bed continuously. The liquid is to be filtered by the bed. The inlet of the pipe is connected to a suitable source of supply, such as a tank filled with waste oil or liquid chemical waste (dirty or used) that it is desired to filter and reuse. As the table rotates, the oil, for example, filters down through the filter bed and drips onto the inclined plates 19 below. From the slot 20 between these plates the oil drains into an arcuate collecting trough 25 extending from below the furnace exit around to a position below its entry end. This trough is provided with an outlet 26 for draining off the filtered oil.

To speed up the filtering in order to rid the filter bed of as much oil as possible before it reaches the furnace, a flushing liquid is applied to the top of the filter bed in an area between the entrance of the furnace and the point at which the oil ceases to freely drip from the bed. This point will vary with different liquids, but in general may be about 60° in front of the furnace entrance. The flushing fluid, which may be hot water or steam, is applied by spraying it from the bottoms of perforated pipes 28 extending across the top of the bed. Since it is undesirable to have the resulting mixture of oil and water mix with the oil that filtered through the bed before reaching the flushing zone, the collecting trough 25 is provided with a partition 29 to keep the two liquids separated. Also, a vertical partition 30 is preferably mounted on inclined plates 19 directly above the trough partition and substantially fills the space bounded by those plates, the lower side walls of the table and the bottom of the table. The portion of the collecting trough between its partition 29 and its adjacent end is provided with an outlet 31 so that the oil and water mixture can be carried away and run through a separator to recover the oil and to permit the water to be recirculated through spray pipes 28.

A further aid to filtering, which reduces the time it otherwise would take, is accomplished by drawing air down through the segment of the filter bed above the collecting trough. This can be done by connecting a vacuum pump 33 with the space between the lower side walls of the table to produce a subatmospheric pressure beneath the table. To confine this low pressure chamber to the segment of the table outside of the furnace, vertical radial partition walls 34 and 35 extend from top to bottom of the area between the lower side walls of the table in locations beneath the entrance and exit, respectively, of the furnace. These walls extend down into the two sealing troughs 16 and 17 to the bottom thereof and also may serve as the end walls of the collecting trough 25. The outer edges of these partitions are located as close as possible to the inner surfaces of the lower side walls of the table and may be provided with sealing strips, against which those side walls slide as the table rotates. At the top of partition walls 34 and 35 there are laterally extending flat plates 36 that engage the bottom of the table and extend far enough around it so that at least one spoke 8 will always engage the top of the plates at each side of the apparatus to prevent air from passing over the two partition walls. The chamber beneath the furnace therefore is isolated from the chamber containing the collecting trough.

The furnace is provided with a number of burners 40 that maintain a high temperature in it. As the wet filter bed enters the furnace, it is dried by the heat as it moves along until it is dry enough for the combustible foreign matter collected by the bed to ignite and be consumed, thereby regenerating the filtering material. The products of combustion leave the furnace through openings 41 in its top that are connected by individual ducts 42 with a common duct 43 that leads to an afterburner 44 connected with a scrubber 45 so that the atmosphere will not be polluted, as shown in FIG. 5. Any of the activated earth that is consumed in the afterburner forms an ash that is collected by the scrubber and can be used as landfill. Consequently, there is no air pollution.

Regeneration of the filter bed is speeded up and made more thorough by two additional operations, namely, agitation of the bed and forcing air through it. For the agitation, as shown in FIG. 2, vertical bars 46 extend down into the bed from a plurality of horizontal bars 47 extending across the furnace at spaced intervals. The bars extend nearly down to the screens and their lower ends may be specially shaped or provided with plows to continually stir the filter bed as it travels past the bars. This action constantly exposes new areas of the bed to the combustion heat so that all combustible foreign matter will be burned out of it. At the same time, air is blown up through the segments of the table and bed in the furnace. This can be done by pumping air into a duct 49 beneath the slot 20 between inclined plates 19, the duct being provided with perforations in its top. The increased air pressure in the chamber beneath the furnace causes air to flow up through the table and the filter bed and into the furnace to aid combustion. This air also helps to dry the wet bed entering the furnace before the combustibles ignite. Burning out of the combustible matter is completed before any given area of the bed reaches the outlet of the furnace, so the air flowing up through the bed in the last part of the furnace helps to cool it. There are no burners in this part of the furnace, which may extend for about 45°.

Since a small percentage of the bed is consumed by the heat in the furnace and is carried away with the products of combustion, it is replaced by new active earth that is added continuously at the exit end of the furnace. This may be done through a conduit 51 (FIG. 1) that extends across the table above the screens a distance equal to the desired depth of the bed. As the bed passes beneath the conduit, enough earth issues from the conduit to maintain the desired depth of bed. It is important to note that regeneration of the bed is effected without removing the filtering material, thereby saving time and equipment, and that regeneration is continuous so that there is no down time. The apparatus can operate continuously without interruption.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Continuously regenerating active earth filtering apparatus for cleaning liquid waste products, comprising an annular foraminous table, concentric upper side walls extending upwardly from opposite sides of the table, concentric lower side walls extending downwardly from opposite sides of the table, a stationary arcuate open-bottom furnace overlying a segment of the table and receiving the upper side walls, means for rotating the table continuously, a bed of activated earth on the table, means adjacent the exit end of the furnace for delivering onto the bed a waste liquid to be filtered, means for drawing air down through the area of the bed and table outside of the furnace, a trough below said area for collecting the filtrate, means beneath the furnace for blowing air up between said lower side walls and through the table and bed into the furnace, and means in the furnace for burning out combustible contaminants collected in said bed during filtering, whereby to regenerate the bed.

2. Filtering apparatus according to claim 1, including means for delivering a flushing fluid to said bed outside of the furnace adjacent its entry end.

3. Filtering apparatus according to claim 2, including stationary vertical partitions between said lower side walls beneath the opposite ends of the furnace to separate the upwardly flowing air from the downwardly flowing air, a partition across said collecting trough separating the partition of the trough below said fluid-delivering means from the rest of the trough, and a stationary vertical partition between said lower side walls above said trough partition.

4. Filtering apparatus according to claim 1, including concentric annular troughs receiving the bottom portions of said lower side walls, and a liquid in the annular troughs sealing the space between the bottoms of the lower side walls and the bottoms of the troughs.

5. Filtering apparatus according to claim 1, including concentric annular troughs receiving the bottom portions of said lower side walls, a liquid in the annular troughs sealing the space between the bottoms of the lower side walls and the troughs, and wheels in said troughs mounted on the lower side walls for supporting them.

6. Filtering apparatus according to claim 1, including stationary vertical partitions between said lower side walls beneath the opposite ends of the furnace to separate the upwardly flowing air from the downwardly flowing air.

7. Filtering apparatus according to claim 1, including means in said furnace for stirring up said bed as it travels therethrough.

8. Filtering apparatus according to claim 1, including a pair of radially spaced downwardly converging plates above said trough, the upper edges of said plates being close to said lower side walls, and said air-drawing means being connected with the space beneath said plates.

9. Filtering apparatus according to claim 1, including a pair of radially spaced downwardly converging plates above said trough, the upper edges of said plates being close to said lower side walls, and said air-drawing means being connected with the space beneath said plates, the plates being annular and extending beneath the furnace, and said air-blowing means being located below the space between said plates under the furnace.

10. Filtering apparatus according to claim 1, said furnace being provided with an outlet for products of combustion, and said apparatus including an afterburner, a scrubber, and ducts connecting said furnace outlet with said afterburner and scrubber in succession.

* * * * *